(12) United States Patent
Gretz

(10) Patent No.: US 7,077,280 B1
(45) Date of Patent: Jul. 18, 2006

(54) FLEXIBLE, CUTTABLE, INSULATING SLEEVE AND BOX EXTENDER

(75) Inventor: Thomas J. Gretz, Clarks Summit, PA (US)

(73) Assignee: Arlington Industries, Inc.

( * ) Notice: Subject to any disclaimer, the term of this patent is extended or adjusted under 35 U.S.C. 154(b) by 628 days.

(21) Appl. No.: 09/956,610

(22) Filed: Sep. 19, 2001

(51) Int. Cl.
*H02G 3/08* (2006.01)
(52) U.S. Cl. .................. 220/3.7; 220/4.03; 174/57
(58) Field of Classification Search .............. 220/4.03, 220/3.2, 3.3, 3.5, 3.7, 3.9, 3.92, 3.94; 174/50, 174/57
See application file for complete search history.

(56) References Cited

U.S. PATENT DOCUMENTS 2,297,862 A * 10/1942 Bachmann ............... 220/241
5,736,674 A * 4/1998 Gretz ........................ 174/50

OTHER PUBLICATIONS

Steel City catalog page showing Thru-Wall Boxes/Switch Box Accessories (prior to Dec. 20, 2000).*
Appleton catalog page showing Outlet Box/Switch Box accessories, Copyright 1987.*
Thepitt catalog pages showing Switch Box Accessories (prior to Dec. 20, 2000).*
Raco catalog page showing Accessories for Steel Boxes (prior to Dec. 20, 2000).*

* cited by examiner

*Primary Examiner*—Nathan J. Newhouse

(57) ABSTRACT

A one-piece plastic part for use as electrical box extender having a rectangular outer opening and an inner opening. The part has two narrow sides and two wide sides joined at their corners to define the outer and inner opening. Two flanges are coplanar with and extend from the two narrow sides. The extender can be inserted into an existing electrical box with the four sides capable of flexing to accommodate the box until the flanges are flush with a surface of newly installed sheet rock. The box extender can be ganged together when necessary. No flanges are used on the two wide sides of the part.

11 Claims, 5 Drawing Sheets

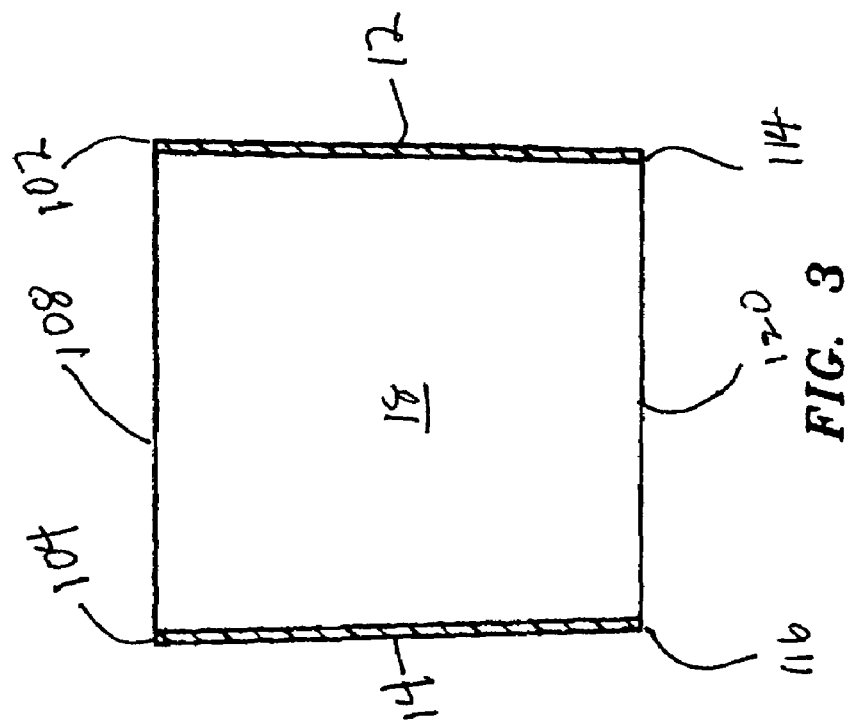
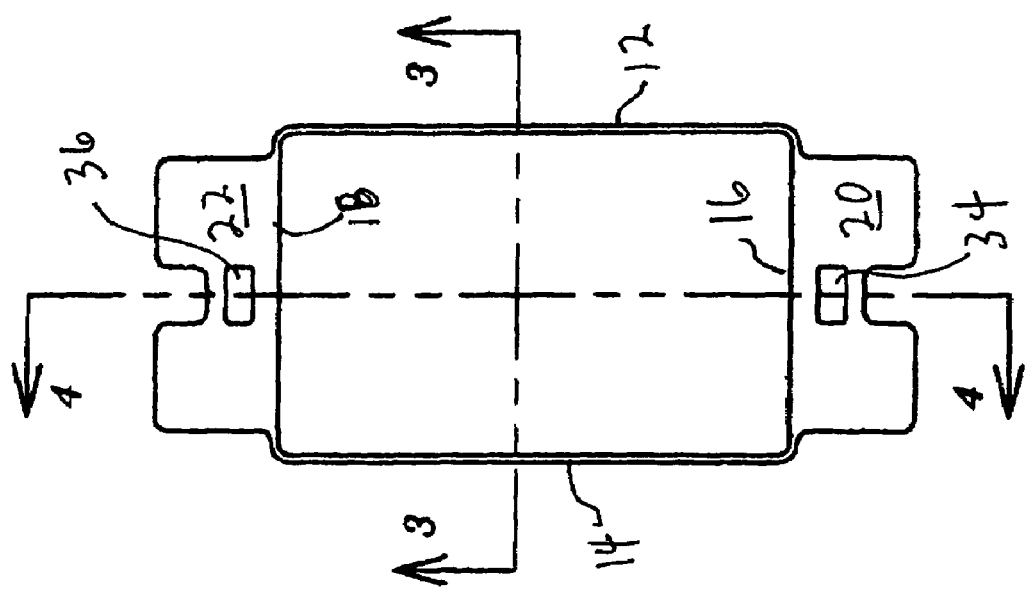

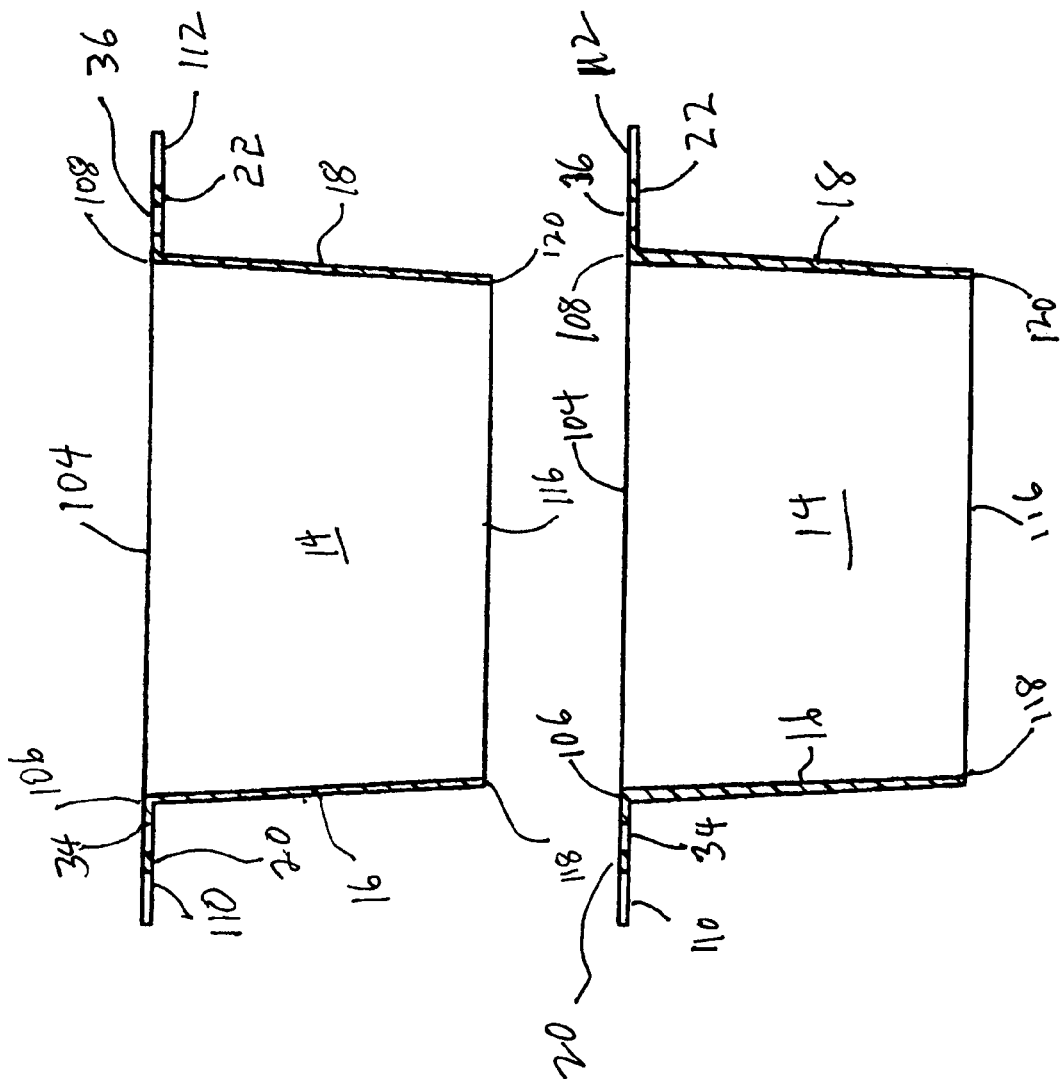

FLEXIBLE, CUTTABLE, INSULATING SLEEVE AND BOX EXTENDER

FIELD OF THE INVENTION

This invention relates to flexible, cuttable and insulating plastic sleeve and electric box extensions particularly, to an improved part that is easier to install and accepts bulky electrical devices such as a ground fault circuit interrupter (GFCI) that insert within electrical boxes and provide electrical insulation.

BACKGROUND OF THE INVENTION

Electrical boxes are commonly used to provide electrical service at convenient locations within buildings. The electrical boxes are commonly formed of plastic or metal and are usually securely fastened by screws or nails to the framework to the building. In newly constructed buildings, the open face of the electrical box, in which an electrical device such as an outlet or switch will be mounted, is usually flush with the surface of the wall or ceiling in which it is installed.

To solve this problem, box extenders of several different types have been developed including both metal and plastic box extenders.

SUMMARY OF THE INVENTION

This invention comprises a flexible, cuttable, insulating sleeve and box extender for use with electrical boxes. It is used for bringing electrical devices such as electrical outlets, switches, ground fault circuit outlets, etc., flush with newly installed sheet stock or the like in a renovated building and may also be used to insulate electrical devices from their associated electrical box. It is both a box extender and device protector.

A first embodiment of insulated tapered sleeve and box extender consists of a one-piece molded plastic part having an outer opening at an outer end; an inner opening at an inner end and thin, cuttable sides of substantially the same thickness. The part can be inserted in to an existing electrical box to either extend an electrical device such as an outlet, switch, etc., so that it will be flush with a new surface or insulate an electrical device or both. A second embodiment is similar to the first embodiment except the thickness of the sides from the outer opening to the inner opening is gradually made more thinner.

The insulating sleeve and extender part can also be used as a device insulator in those locations where an electrical device does not need to be extended to a new wall surface but rather where there is a limited amount of space to crease a secure device which is not prone to shorting out. A typical example would be the installation of a GFCI device in an electrical box. The GFCI device is a bulky device that fits with little clearance into an electrical box. The terminals on the side of a GFCI are close fitting to the side of a metal electrical box and frequently the GFCI will be tripped when the terminals contact the side of the box. The sleeve and extender is inserted within an existing electrical box to act as a device insulator and keep bulky electrical devices insulated from the surrounding electrical box and also be used as a box extender if needed.

One-piece plastic box extenders that are flexible, cuttable and insulating are already being used based on the inventions of the present inventor. These are shown in U.S. patent application Ser. No. 09/792,176 filed Feb. 23, 2001 and U.S. patent application Ser. No. 09/817,608 filed Mar. 26, 2001, which is a continuation-in-part of U.S. patent application Ser. No. 09/782,890 filed Feb. 14, 2001, which is a continuation-in-part of U.S. patent application Ser. No. 09/373,428 filed Aug. 13, 1999 and now U.S. Pat. No. 6,180,879 which is a continuation-in-part of U.S. patent application Ser. No. 07/003,244 filed Jan. 6, 1998, and now U.S. Pat. No. 5,959,246 which is a continuation-in-part of U.S. patent application Ser. No. 08/773,413 filed Dec. 27, 1996 and now U.S. Pat. No. 5,736,674 which is a continuation-in-part of U.S. patent application Ser. No. 08/667,983 filed Jun. 20, 1996, and now.

All of the above applications and their issued patents are referred to herein and made a part hereof in their entirety.

All of the previous embodiments of applicant's invention used a face plate which used flanges along a wide side. However, in this invention, the face plate with flanges along a wide side is eliminated and the sides are closed and are joined at their corners in a manner that the product is tapered inward. The sides must be made of a thin plastic that is thin, cuttable and flexible to accommodate being placed on a large variety of boxes. Preferably all the sides are the same depth with two wide and two narrow sides but some may be foreshortened if desired, especially the narrow sides.

The insulating sleeve and box extender of this invention not only provides a product with great versatility to accommodate a wide variety of electrical boxes, it also can be readily be ganged together by placing adjacent boxes next to each other. The cuttable walls permit ready cutting to accommodate unusual situations and may be precut if a sufficient quantity of a special part is needed.

ADVANTAGES

The present invention provides a one-piece thin, cuttable, insulating, flexible plastic sleeve and electrical box extender without a face plate which will extend electrical boxes from a position deep within an interior surface of a building to a new position that is flush with a newly installed surface and/or provide insulation. The part can accommodate a wide variety of sizes of electrical boxes and can be easily ganged together.

DESCRIPTION OF THE DRAWINGS

FIG. 2 is a front view of the outer end of the sleeve and box extender shown in FIG. 1.

FIG. 3 is a sectional view of FIG. 2 taken on section 3—3.

FIG. 4 is a sectional view of FIG. 2 taken on section 4—4.

FIG. 7 is a sectional view taken on section 7—7 of FIG. 5.

DETAILED DESCRIPTION OF THE INVENTION

The invention is a plastic one-piece face-less or no face plate, flexible, cuttable insulating sleeve for use as a box extender for extending an existing electrical box to bring it flush with a newly installed surface in a building and/or a device insulator which provides insulation between an electrical device and an electrical box.

Figure 1:
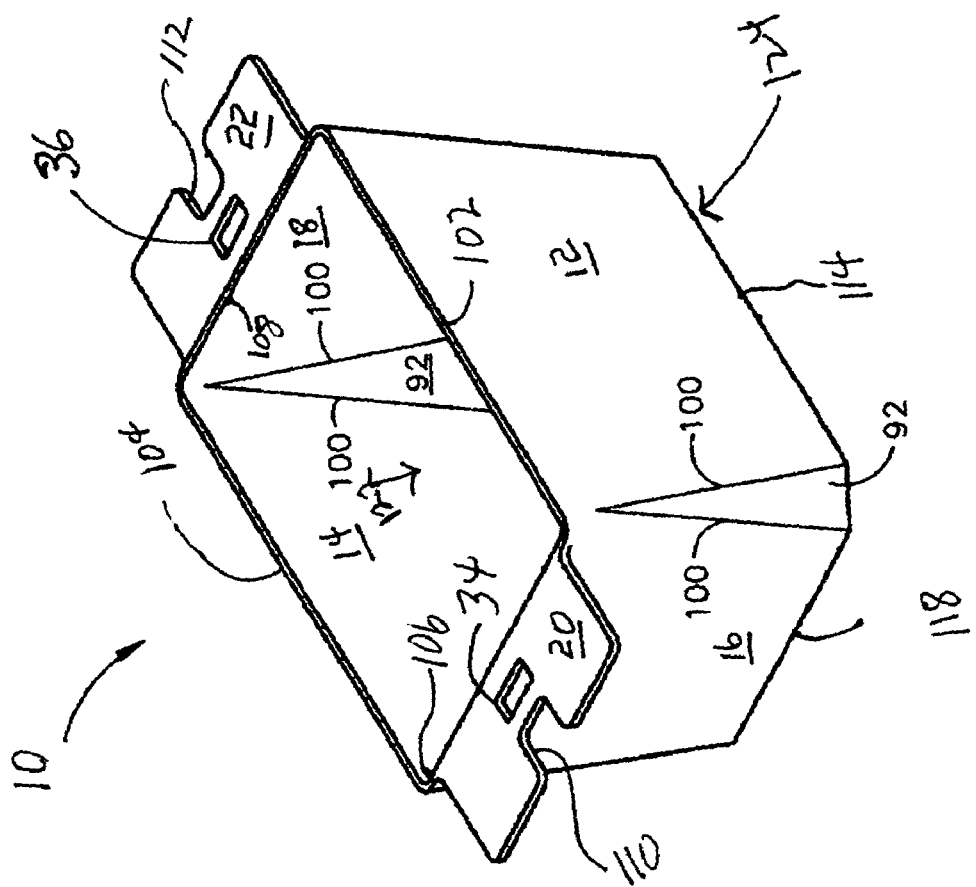
FIG. 1 is a perspective view of the preferred embodiment of the sleeve and extender.

A perspective view of the preferred embodiment of the one-piece insulting faceless sleeve 10 of the present invention is shown in FIG. 1. The sleeve 10 consists of a one-piece plastic member having an outer opening at an outer end and an inner opening at an inner end with four integral sides 12, 14, 16, 18 forming an electrical box extender and insulator or device protector. The sides consist of wide sides 12, 14 and narrow sides 16, 18. By "faceless" is meant to distinguish the new invention from those having face plates or members with flanges along the wide sides. Instead, there is no face plate or member since the wide sides 12 and 14 terminate at an outer edge 102 and 104, respectively. Flanges 20, 22 extend from the outer edges 106 and 108, respectively, of narrow sides 26, 28. The flanges have apertures 34, 36 for receiving screws that are typically 0.145 inches in diameter. The apertures are preferably oblong or elongated with the long dimension being 0.310 and the short dimension being 0.15 inches. The flanges 20, 22 serve to carry apertures 34 and 36 to rest on the new wall but need not do so. The flanges 20, 22 are flat and thin and approximately 0.04 inches thick so that they can fit in the recessed underside (not shown) of cover plate 66. The flanges 20, 22 extend approximately 1.5 inches in width which is shorter than the inner width at the outer edges of 106 and 108 of the sleeve which is approximately 1.77 inches inside width. The end flanges preferably have U-shaped cut outs or apertures 110 and 112 centered on the outer edges with a width of approximately 0.31 inches and a depth of approximately 0.28 inches. This cut-out is to accommodate the heads of screws in some installations. The sides 12, 14, 16, 18 form a generally rectangular tubular sleeve portion capable of receiving an electrical device and of being received within an electrical box.

The sides 12, 14, 16 and 18 are thin and planar and converge inward as viewed from the outer edges 102, 104, 106 and 108, towards the inner edges 114, 116, 118 and 120, respectively.

FIG. 2 is a top view of the outer end of the box extender showing the flanges 20, 22 with apertures 34, 36 and sides 12, 14, 16 and 18. FIG. 4 shows the wide side 14 which has an inside length between outside edge 106 and outside edge 108 of 2.836 inches and converges inward so that the inside length along the center line between outer edge 106 and outer edge 108 is 2.610 inches. The dimensions of side 12 are similar to side 14.

With reference to FIG. 3, there is a cross-section 3—3 of FIG. 2 which shows narrow side 18 in the end view with wide sides 12 and 14 at each end. It is to be noted that FIGS. 3, 4, 6 and 7 are all scaled to a larger dimension than FIGS. 2 and 5.

The outer edge 104 and inner edge 116 of side 14, the outer edge 102 and inner edge 114 of side 12 are shown.

With reference to FIG. 4 there is a cross section 4—4 of FIG. 2 which shows outer edge 104 and inner edge 116 of wide side 14. There is also shown flanges 20 and 22, apertures 34 and 36 and U-shaped cut-outs or apertures 110 and 112.

As can be seen in FIGS. 3 and 4, the sides converge inward from the outside edge to the inside edge. In the preferred example shown in FIG. 3, the width on the inside at the outer end from outer edge 104 to outer edge 102 of narrow side 18 is 1.770 inches and converges inward so that the inside width between inner edge 114 and inner edge 116 across the narrow side 18 as measured on the center line is 1.687 inches. The same dimensions are also found on narrow side 16.

Thus the sides are seen to have a slight inward taper and are trapezoidal but need not be as shown in the figures.

The above dimension do not take in consideration the inside area of the inner opening where the corners use triangle for making the corner as seen in FIG. 1.

The four sides 12, 14, 16 and 18 are each flat thin plastic members having a thickness of approximately 0.03125 to 0.060 inches and preferably to 0.040 inches. The narrow sides 16 and 18 are preferably 1.770 inside width at the outer end. The wide sides 12 and 14 are preferably approximately 2.836 inches wide as measured inside at the outer end. The depth of the sides of the sleeve and box extender as measured from the outer end to the inner end is preferably approximately 1.750 inches.

Preferably the depth of the sides is the same for all four sides. However, the two narrow sides may be shorter than the two wide sides or vice versa. Also, the inner end of the side may be pre-cut to fit obstructions or cut on the job site. The depth of the sides can be as little as ⅝ inch deep but generally are ⅞ inch to approximately 1.85 inches deep and preferably approximately 1.750 inches deep.

The four sides are connected where they meet one another by a suitable corner 92. This corner may form approximately (1) a right angle between the adjacent sides, (2) may be slightly rounded, (3) may be joined by a flat triangle such as shown on FIG. 1 or (4) may be a combination of these are similar configurations. The triangle joins the adjacent sides along a line 100 and is approximately 0.25 inches wide at the base and extends toward the apex at the outer end to approximately 0.25 inches below the outer end.

Figure 8:
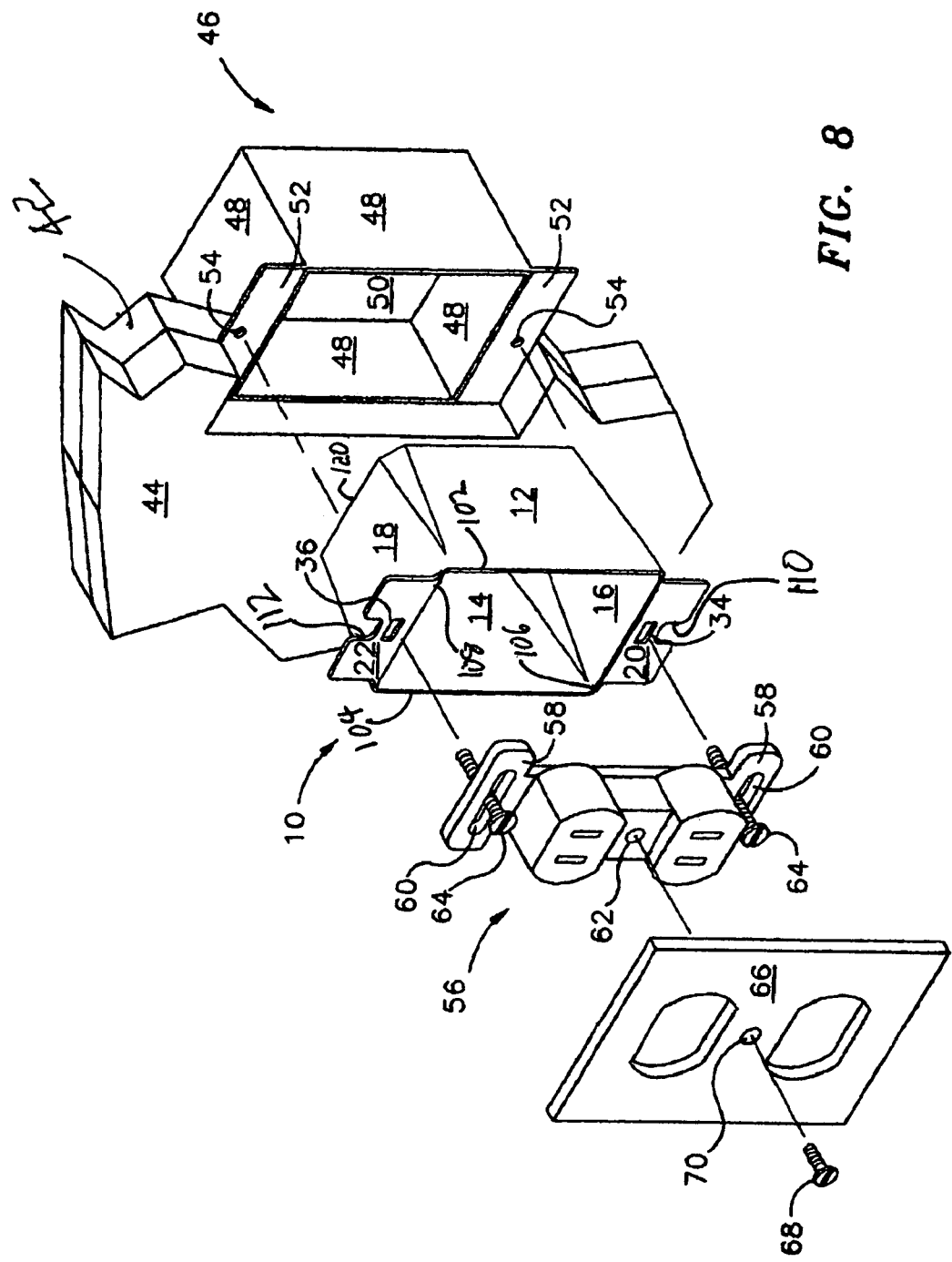
FIG. 8 is an exploded view of FIG. 1 including an electrical box with a wall, a duplex outlet and cover plate.

The electrical box extender 10 is typically installed as shown in FIG. 8 which is an exploded perspective view with a cutaway section of an existing wall 42 and a newly installed wall 44. This is the typical arrangement when installing the box extender 10 with the existing electrical box 46 installed flush with the existing wall 42, a newly installed wall 44 on top of the existing wall 42, an opening cut in the newly installed wall 44, an electrical device 56 (in this case a duplex outlet) and a cover plate 66.

Referring to FIG. 8, the existing electrical box 46 has side walls 48 and a back wall 50. The electrical box 46 has flanges 52 and threaded apertures 54 within the flanges for receiving screws 64. These threaded apertures 54 are the same apertures that are in the electrical box 46 originally for receiving the screws that thread through the ears of an electrical device and secure the device to the box.

In a common application of the invention, the existing outlet (not shown in FIG. 8) is removed from the electrical box 46. The box extender 10 is then pushed into the electrical box 46 with the wide sides 12, 14 and narrow sides 16, 18 pushed in between the side walls 48 of the electrical box 46. The wide sides 12, 14 and narrow sides 16, 18 of the box extender are capable of converging inward with the area of the outer opening 122 being larger than the area of the inner opening 124. The electrical device may be inserted into the box extender before being inserted.

The sleeve and box extender is made from a flexible plastic material with sides that flex to the extent necessary as the product is inserted into the electrical box 46 thereby accommodating a wide range of sizes of electrical boxes. If the existing wires enter the electrical box 46 from the side walls 48, and those wires interfere with the travel of the wings of the box extender 10 into the box 46, then a portion of the plastic sides 12, 14, 16, 18 may be easily manually trimmed with scissors or the like to keep the wires from interfering with the travel of the sides into the electrical box 46. If the existing wires enter the electrical box 46 through the back wall 50, there will usually be no interference of the wiring with the travel of the sides of the box extender 10 into the electrical box 46 and trimming of the wings is therefore unnecessary.

The box extender 10 is inserted into the electrical box 46 until part of the inward surface of flanges 20 and 22 abut the newly installed wall 44. If the existing electrical box 46 is a shallow box, unable to accommodate the entire travel of the sides 12, 14, 16, 18 into the box 46, then the sides of the box extender 10 may be trimmed with scissors or the like to accommodate the electrical box and its wiring. The box extender 10 when properly sized or trimmed will therefore accommodate a shallow electrical box.

After the box extender 10 is fully seated and abutted against the newly installed wall 44 and aligned with the electrical box 46, the duplex outlet 56, switch, or other electrical device is aligned with the box extender 10. FIG. 8 depicts a duplex outlet 56 in alignment with the box extender 10 which in turn is in alignment with the electrical box 46. The slots 60 in the ears 58 of the duplex outlet 56 are in alignment with the apertures 34, 36, in the respective flanges 20, 22 of the box extender 10 and the apertures 34, 36, are also in alignment with the threaded apertures 54 in the electrical box 46. One long screw 64 is pushed through slot 60 in the top ear 58 of the duplex outlet 56, through the aperture 46 in flange 20, and screwed into threaded aperture 54 in the top flange 52 of the electrical box 46. A second long screw 64 is pushed through slot 60 in the bottom ear 58 of the duplex outlet 56, through the aperture 34 in flange 20, and screwed into threaded aperture 54 in the bottom flange 52 of the electrical box 46. Both screws 64 are then tightened the proper amount to abut the inward surfaces of flanges 20 and 22 against the surface of the newly installed wall 44 and to securely fasten the duplex outlet 56 to the box extender 10 and the electrical box 46. Both screws 64 may be trimmed to a shorter length or shorter screws may be used if required by a thin newly installed wall 44 or a shallow electrical box 46.

After the duplex outlet 56, switch, ground fault circuit outlet, or other electrical device is secure to the electrical box 46, then a cover plate 66 maybe fastened with a screw 68 through the aperture 70 in the cover plate 66 and into the threaded aperture 62 in the duplex outlet 56, switch, ground fault circuit outlet, or other electrical device. This completes the task of extending the existing electrical device to the new surface 44 without installing a new electrical box or moving the existing electrical box 46. The electrical device is now flush with the new wall surface 44 and is aesthetically pleasing to the eye.

Suitable materials of construction for this invention include a flame-retardant nylon having an Underwriters Laboratories rating for flammability of 94V-O, a minimum RTI of 90-50-90 and a hot wire ignition of 3 or less. The material is rated at the above specification for a minimum of 0.40 inches (1 mm) thickness. The RTI is a temperature index (degrees Celsius) of nylon properties with the first two digits referring to "electrical", the second two digits referring to "mechanical with impact", and the third two digits referring to "mechanical without impact". Other standards organizations may have equivalent ratings. Two suitable nylons are Vydyne (Trademark) nylon M344, Monsanto, St. Louis, Mo., US, and Akulon (Trademark) K225-KS nylon of DSM Engineering Plastics, 6130 AA Sittard Netherlands.

Another material found to be satisfactory is a polyolefin such as polypropylene rated 105° C. continuous use made by A. Schulman Company as RPP-1174. Other suitable similar plastics may be used provided the combination of the thinnest of the material and flexibility of the plastic are satisfactory to provide sufficient flexibility and cuttability to enable the sides to be capable of flexing sufficiently to allow insertion in a variety of electrical boxes.

The part shown is also designed for use by itself as a device insulator. The part is used for insulating the terminal strips on a bulky electrical device such as GFCI from the interior metal walls of an electrical box. One purpose is to prevent unintentional shorting or tripping of the GFCI by inadvertent contact of the terminals on the GFCI with the walls of the electrical box. Bulky electrical devices such as the GFCI are notorious for shorts caused by the tight fit of the GFCI within the electrical box.

A key feature of the sleeve and box extender is that it is flexible so that it can readily be adapted to existing electrical boxes. This flexibility is achieved by a combination of thinness of the material and the choice of the plastic. The plastics mentioned above have been found to be satisfactory but other similar plastics may also be used provided they are sufficiently flexible and cuttable. As used herein, the cuttability is a combination of the material and it's thinnest. The cutability must be achieved by tools an electrician would ordinarily be expected to carry such as a knife, scissors are similar cutting devices.

The material forming the sides must be between approximately 0.03125 inches in thickness and approximately 0.060 inches and is preferably approximately 0.040 to 0.045 inches thick. The thinner material may be too thin using present materials so at present, the minimum thickness would be somewhat thicker. The maximum thickness is approximately 0.060 inches to be satisfactory with existing electrical boxes. These thicknesses are when the sides are relative uniform in thickness such thickness may be tapered as shown in the second embodiment of FIGS. 5, 6 and 7 infra.

The thicknesses of the sides are not as important for the first ¼" of depth as measured from the outer edges of the part where the thickness can be substantially thicker. Therefore, when the thickness of the sides is mentioned herein it is usually referring to the thickness of the sides that extend between ¼" depth from under the flanges at the outer end to the depth at the inner end.

Figure 6:
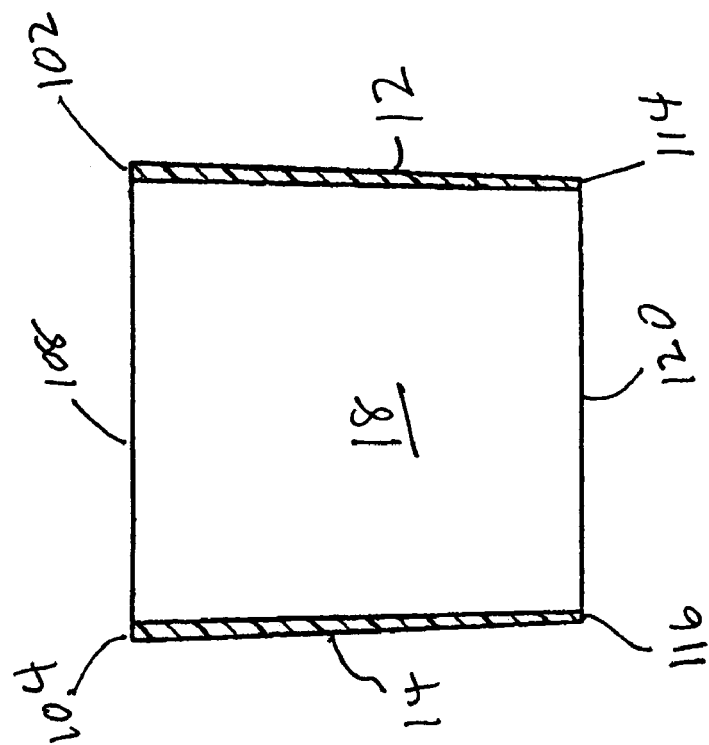
FIG. 6 is a sectional view taken on section 6—6 of FIG. 5.
Figure 5:
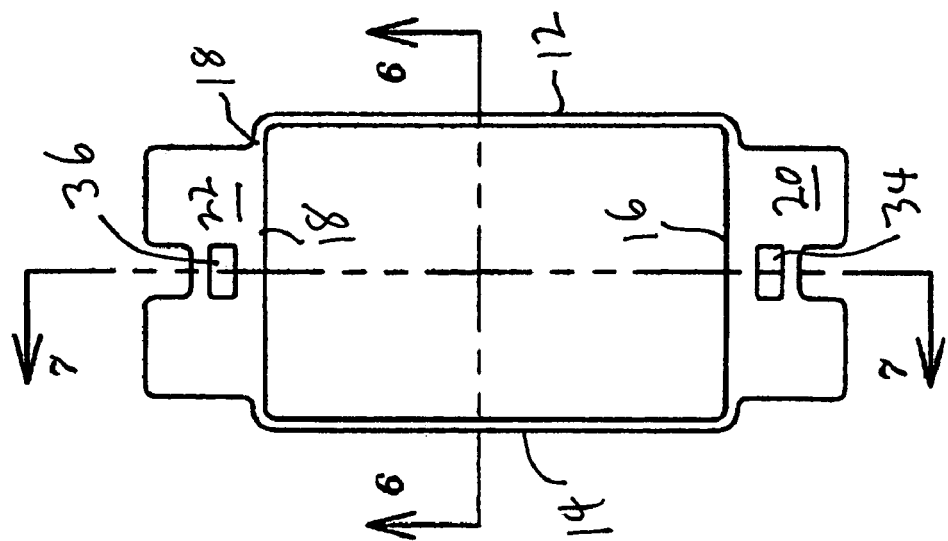
FIG. 5 is a front view of the outer end of another embodiment of FIG. 2.

With reference to the second embodiment shown in FIGS. 5, 6 and 7, the same numbers are used to identify the various parts. The thickness of the sides are preferably approximately 0.40 inches at the inner end and approximately 0.60 at the outer end. The thickness of the sides for a ¼ inch just below the outer end may be slightly thicker than the 0.060 inches.

The flangeless wide sides where the part is of uniform thickness is an important advantage since two parts can abut one another along their wide sides and thus be "ganged" together. This can permit a series of parts up to five and possibly more can be "ganged" together for some electrical boxes. It is important that the aperture be elongated so that the thickness of the sides can be accommodated by small shifts in location of the elongated aperture so as to permit the screw to pass through.

A person of ordinary skill in the art will recognize that numerous variations of the sleeve and box extender are possible by utilizing the principles set forth herein. Although there has been shown and described an example of what is at present considered preferred embodiments of the present invention, it will be and that it is obvious to one of ordinary skill in the art that various changes and modifications may be made therein without departing from the scope of the invention as defined by the appended claims.

The invention claimed is:

1. A one piece plastic part for an electrical box comprising:
   - a sleeve having an outer opening at an outer end and an inner opening at an inner end;
   - two first sides opposite one another and two second flangeless sides opposite one another;
   - corners connecting said first sides and said second flangeless sides;
   - each of said first sides having an outer edge and an inner edge;
   - a flange extending sideways from each of said outer edges of said first sides;
   - said flanges being sufficiently thin to be recessed under a cover plate;
   - each of said second flangeless sides having an outer edge and an inner edge;
   - said outer opening having said outer edge of said first sides and said outer edges of said second flangeless sides substantially coplanar with each other;
   - said sides forming a generally tubular body sized to receive an electrical device;
   - said first sides and said second flangeless sides being made of a flexible plastic having a thinness extending from ¼ inch just below said outer edges to said inner edges of approximately 0.060 inches thick or less which allows said tubular body to be received in a variety of electrical boxes; and
   - an opening in each of said flanges capable of passing screws therethrough for fastening an electrical device to an electrical box.

2. The part of claim 1 wherein said first sides and said second flangeless sides have a depth of between approximately ⅝ inch and 1.85 inches.

3. The part of claim 1 wherein said first sides and said second flangeless sides are approximately 1.750 inches in depth from said outer edges to said inner edges.

4. The part of claim 1 wherein said first sides and said second flangeless sides are the same depth.

5. The part of claim 1 wherein the area of said inner opening is less than the area of said outer opening.

6. The part of claim 1 wherein said first sides and said second flangeless sides have a thinness extending from ¼ inch just below said outer edges of said first sides and said second flangeless sides to said inner edges of between approximately 0.03125 inches to approximately 0.060 inches.

7. The part of claim 1 wherein said first sides and said flangeless sides have a thinness of approximately 0.040 inches to approximately 0.045 inches for their full depth below said outer edges.

8. The part of claim 1 wherein said part is made of nylon.

9. The part of claim 1 wherein said part is made of polyolefin.

10. The part of claim 1 wherein said second flangeless side is capable of abutting with another second flangeless side of an adjacent part with said aperture in said flanges of both said parts being elongated whereby at least two parts may be ganged together in an electrical outlet box.

11. The part of claim 1 wherein said first sides and said second flangeless sides are of a thickness tapered from ¼ inches just below said outer edges to said inner edges from approximately 0.060 inches thick near said outer end to approximately 0.03125 inches thick at said inner edge.

* * * * *